Feb. 19, 1957 W. A. PAPWORTH 2,781,800
MANUALLY PORTABLE BAYONET SAW WITH OVAL STROKE
Filed Nov. 5, 1954 2 Sheets-Sheet 1
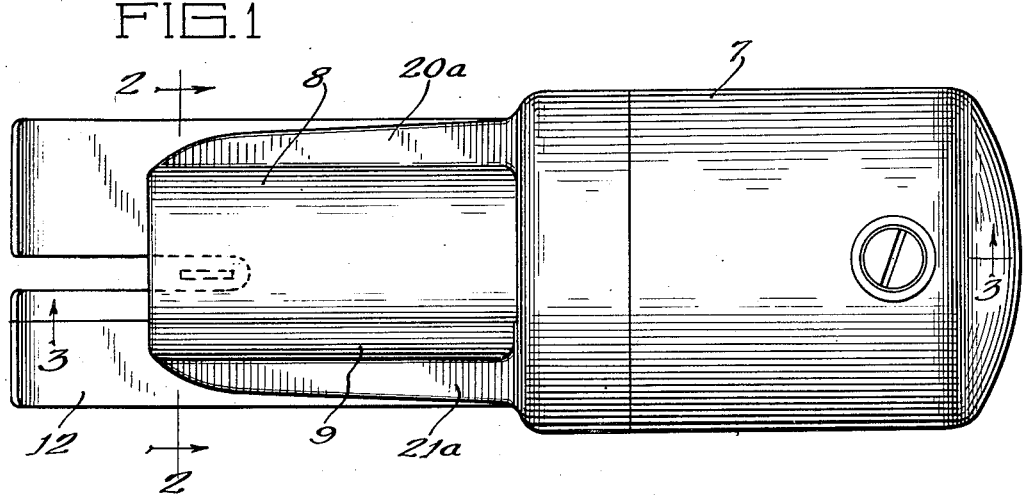
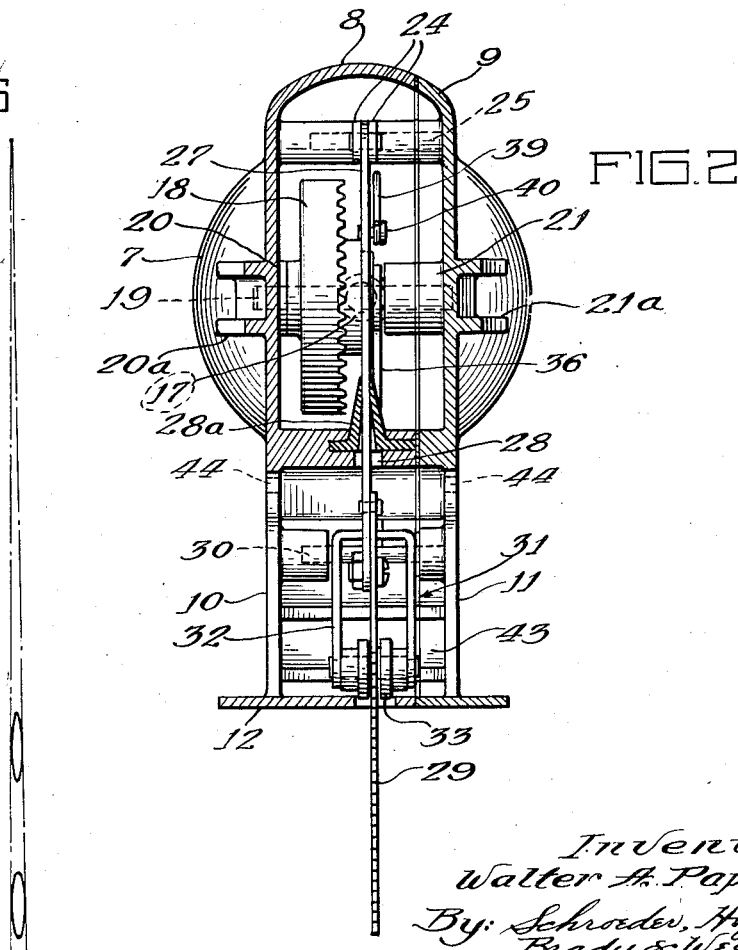
Inventor:
Walter A. Papworth
By: Schroeder, Hofgren,
Brady & Wegner
Attorneys

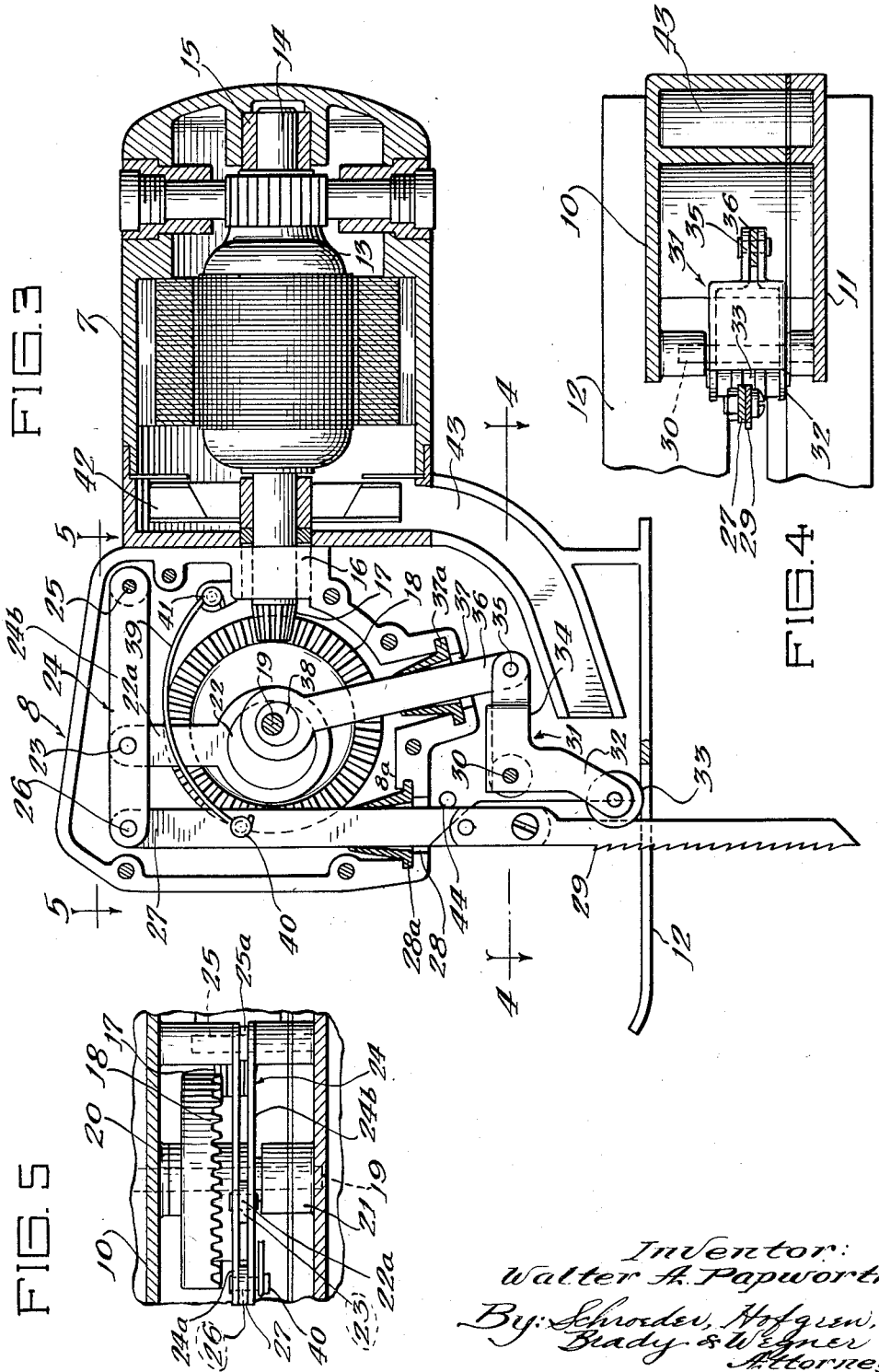

2,781,800

MANUALLY PORTABLE BAYONET SAW WITH OVAL STROKE

Walter A. Papworth, Syracuse, N. Y.

Application November 5, 1954, Serial No. 467,130

14 Claims. (Cl. 143—68)

This invention relates to a manually portable power driven reciprocable cutting tool, and in particular it relates to a jig or bayonet saw which is provided with a simple mechanism for moving the saw blade in an oval orbit whose major axis is relatively long and whose minor axis is as short as may be desired.

The principal object of the invention is to provide an improved reciprocable cutting tool.

A further object of the invention is to provide a cutting tool such as a bayonet saw in which a normally substantially vertical reciprocating motion is imparted to a tool plunger by means of a simple eccentric and lever arrangement, and a fore and aft movement is imparted to the saw blade by means of an eccentric of small throw which moves a pivoted tool guide forward on the cutting stroke to thrust the saw blade edgewise into the work, the saw blade being retracted from the work by a resilient means.

A further object of the invention is to provide a manually portable power driven bayonet saw in which fast cutting is promoted by mechanically driven impact of the saw teeth into the work during the cutting stroke in an elongated oval path.

A further object of the invention is to provide a manually portable power driven bayonet saw which is easy to handle, and has a very small number of simple, rugged operating parts.

A further object of the invention is to provide such a device in which all reciprocating parts are straddle mounted.

The invention is illustrated in a preferred embodiment in the accompanying drawings in which:

Fig. 1 is a plan view of a saw embodying the invention;

Fig. 2 is a section taken substantially as indicated along the line 2—2 of Fig. 1;

Fig. 3 is a section taken substantially as indicated along the line 3—3 of Fig. 1;

Fig. 4 is a section taken substantially as indicated along the line 4—4 of Fig. 3;

Fig. 5 is a fragmentary section taken substantially as indicated along the line 5—5 of Fig. 3; and Fig. 6 (sheet 1) is a diagram showing the approximate path of the saw teeth at the upper and lower portions of the saw blade below the foot plate.

Referring to the drawings in greater detail, the frame, or casing of the machine includes a motor housing 7, a gear case indicated generally at 8 which has a lower wall 8a, and a gear case cover 9 which closes one side of the gear case. The side wall of the gear case 8 extends below wall 8a to form a frame wall 10, and the portion of the cover 9 below the lower wall forms a frame wall 11, said frame walls terminating in a foot plate 12.

A motor 13 has its shaft 14 suitably journalled in roller bearings 15 and 16 which are mounted, respectively, in one end of the motor housing and in a wall of the gear case. A bevel pinion 17 on the end of the motor shaft 14 inside the gear case meshes with a bevel gear 18 which is mounted on a spindle 19 journalled in bosses 20 and 21 in the gear case and the gear case cover, respectively. The bosses 20 and 21 extend outwardly of the casing and merge into longitudinal ribs 20a and 21a which afford a firm and comfortable hand hold across the narrow gear case of the machine.

As best seen in Fig. 3, the gear 18 is provided with a major eccentric 22 having a major connecting rod 22a which makes connection at a pivot 23 with an amplifying lever 24 which is mounted on a pivot 25 in the frame. The lever 24 is connected at its free end by a pivot 26 to a tool plunger 27 which is vertically positioned in the gear case 8 and extends through an opening 28 in the bottom wall 8a of the gear case 8. A flexible grease seal 28a is mounted in the opening 28. Secured to the outer end of the tool plunger 27 in the conventional manner is a bayonet saw blade 29.

As seen in Fig. 5, the lever 24 is composed of two parallel elements 24a and 24b, which are spaced apart by shoulder spacers at pivots 23 and 26, and a washer 25a at pivot 25. Thus, it can be seen that as the motor operates it turns the gear 18 which operates the major eccentric 22 so as to work through its connecting rod 22a and the lever 24 to reciprocate the tool plunger 27 endwise and with it the bayonet saw blade 29.

A transverse pin 30 in the lower frame walls 10 and 11 pivotally supports a bell crank, indicated generally at 31, which has a bifurcated presser guide arm 32 provided with a grooved guide wheel 33 which bears against the back of the saw blade 29, and a linking arm 34. The linking arm 34 is bifurcated and is provided with a shoulder pivot 35 to receive a minor connecting rod 36 which extends through an opening 37 in the lower part of the gear case and is sealed with a grease seal 37a. The minor connecting rod 36 is pivoted at its upper end on a minor eccentric 38 which is mounted on the gear 18. Thus, when the gear 18 rotates the minor eccentric 38 acts through the minor connecting rod 36 to rock the bell crank 31 about its pivot 30 which imparts fore and aft movement to the saw blade 29. The saw blade 29 is resiliently urged into engagement with the supporting roller 33 by means of a lead spring 39 which engages a pin 40 on the tool plunger and a similar pin 41 on the frame adjacent the bearing 16 for the motor shaft.

On the motor shaft 14 ahead of the motor is a blower 42 which delivers air through a passage 43 to remove sawdust from the area of the blade.

In order to change saw blades it is necessary to take the pressure of the saw blade off the backing wheel 33, and for this purpose a pair of holes 44 are formed through the lower frame walls 10 and 11 so that a nail may be inserted through the holes to hold the tool plunger forward against the tension of spring 39 when the blade 29 is removed.

The combination of the major eccentric 22 and the minor eccentric 38, acting respectively through lever arm 24 and bell crank 31, plus the spring 39, serve to drive the tool plunger 27 in a modified reciprocating motion, the movement of the bell crank occasioned by its connection to the minor eccentric 38 causing forward movement of the tool plunger 27 about the pivot 26, thus causing the saw blade 29 to travel in an oval, or nearly translatory path, the shape of which at the upper and lower parts of the blade is shown in the diagram Fig. 6. The two eccentrics are so coordinated that the saw blade 29 is thrust edgewise into the work on its up, or cutting stroke, while the spring 39 swings the saw blade rearwardly away from the working face with the rearward movement of the bell crank 31 upon the downward, or return stroke of the saw blade.

The foregoing detailed description is given for clearness of understanding only and no unnecessary limitations are to be understood therefrom, as some modifications will be obvious to those skilled in the art.

I claim:

1. A power driven, reciprocable manually portable cutting tool comprising: a frame; a motor in said frame; vertically disposed cutter means mounted for endwise movement in the frame, said cutter means including a tool plunger and a toothed cutting tool secured thereto; a gear journalled in said frame and having driving connection with the motor; major eccentric means on said gear and operatively pivotally connected to the tool plunger for imparting endwise movement thereto; a bell crank pivoted on the frame which has on one arm guide means engaged with the rear edge of the cutting tool; minor eccentric means on the gear and making driving connection with the other arm of said bell crank for thrusting the cutting tool edgewise into the work on its cutting stroke; and spring means in the frame resiliently urging the cutting tool against the guide means.

2. A power driven, reciprocable manually portable cutting tool comprising: a frame; a motor in said frame; vertically disposed cutter means mounted for endwise movement in the frame, said cutter means including a tool plunger and a toothed cutting tool secured thereto; a gear journalled in said frame and making driving connection with the motor; a major eccentric on the gear and operatively pivotally connected to the tool plunger to impart endwise movement thereto; a guide member movably mounted in the frame and having a portion bearing on the rear edge of the cutting tool; a minor eccentric on the gear operatively connected to said guide member to move said forward member and thrust the cutting tool edgewise into the work on the cutting stroke; and a spring urging the cutting tool resiliently against the guide member, said major eccentric, said minor eccentric, said guide member and said spring cooperating to move the cutting tool in a generally oval path.

3. A power driven, reciprocable manually portable cutting tool comprising: a frame; a motor in said frame, said motor having a shaft provided with a pinion; a gear journalled in the frame and meshing with said pinion; a major eccentric on the gear; a connecting rod journalled on said eccentric; an amplifying lever pivoted in the frame and having pivotal connection with said connecting rod; a tool plunger pivotally connected to the free end of said lever; a cutting tool secured to the outer end of said tool plunger; a bell crank pivoted in the frame; a roller journalled in the bell crank and bearing against the rear edge of the cutting tool; a minor eccentric on the gear; a connecting rod operatively connecting said minor eccentric to said bell crank; and spring means for pressing the cutting tool against said roller, the whole cooperating to thrust the cutting tool in an elliptical path firmly against the work during its cutting stroke and to retract it during its return stroke.

4. In a power driven manually portable cutting tool: a frame; a motor in said frame having a shaft with a pinion; a gear case in said frame; drive gear means in said gear case in a plane parallel to the motor shaft and meshing with said pinion; drive means in the gear case including a crank driven by said gear means in a plane parallel to said drive gear means; a tool plunger pivoted at its upper end on said drive means and extending through the bottom of the gear case for generally endwise movement in a plane parallel to the drive gear means; a saw blade secured to the outer end of the plunger; oscillator means bearing against the rear edge of the saw blade; and actuating means in a plane parallel to the drive gear means operatively connecting said oscillator means to said motor shaft to thrust the saw blade edgewise into the work on its cutting stroke only.

5. A power driven, reciprocable, manually portable cutting tool comprising: a frame; a motor in said frame; first eccentric means supported in the frame and operatively connected to said motor; cutter means mounted in the frame for movement generally endwise of itself, said cutter means including a tool plunger and a toothed cutting tool secured thereto; motion multiplying means operatively connecting said first eccentric to the tool plunger to impart endwise movement to the latter; a second eccentric operatively connected to said motor; and oscillating means one end portion of which is operatively connected to said second eccentric and the other end portion of which bears on the rear of the cutter means to thrust the cutting tool edgewise into the work during its cutting stroke only.

6. A power driven, reciprocable, manually portable cutting tool comprising: a frame; a motor in said frame; eccentric means supported in the frame and operatively connected to said motor; cutter means mounted in the frame for movement generally endwise of itself, said cutter means including a tool plunger and a toothed cutting tool secured thereto; first lever means operatively connecting said eccentric means to the tool plunger to impart a predetermined endwise movement to the latter; and second lever means wholly separate from said first lever means, one end portion of said second lever means being operatively connected to said eccentric means and the other end portion thereof bearing on the rear of the cutter means to thrust the cutting tool edgewise into the work during its cutting stroke only, the relationship between the first and second lever means being such that the edgewise thrust is only a small fraction of the endwise movement.

7. A power driven, reciprocable, manually portable cutting tool, comprising: a frame; a motor in said frame; cutter means mounted in the frame for movement generally endwise of itself, said cutter means including a tool plunger and an elongated cutting tool secured thereto; a gear journaled in said frame and having driving connection with the motor; major eccentric means on said gear and operatively pivotally connected to the tool plunger for imparting endwise movement thereto; minor eccentric means on the gear; and linkage means operatively engaged with said minor eccentric means and bearing on the rear of the cutter means to thrust the cutting tool edgewise into the work on its cutting stroke only, the relationship between the major eccentric means and the minor eccentric means being such that the edgewise thrust is only a small fraction of the endwise movement.

8. A power driven, reciprocable, manually portable cutting tool, comprising: a frame, a motor in said frame, cutter means mounted in the frame for movement generally endwise of itself, said cutter means including a tool plunger and an elongated cutting tool secured thereto; a gear journaled in the frame and having driving connection with the motor; major eccentric means on said gear and operatively pivotally connected to the tool plunger for imparting endwise movement thereto; a bell crank pivoted on the frame, one arm of said bell crank constituting guide means engaged with the rear of the cutting tool; and minor eccentric means on the gear which makes driving connection with the other arm of said bell crank for imparting oscillatory movement to the bell crank to thrust the cutting tool edgewise into the work on its cutting stroke only, the relationship between the major eccentric means and the minor eccentric means being such that the edgewise thrust is only a small fraction of the endwise movement.

9. A power driven, reciprocable, manually portable cutting tool, comprising: a frame; a motor in said frame; cutter means mounted in the frame for movement generally endwise of itself, said cutter means including a tool plunger and a toothed cutting tool secured thereto; a gear journaled in said frame and having driving connection with the motor; an amplifying lever pivoted in the frame and pivotally connected to the tool plunger; a major eccentric driven by said gear, said eccentric having a major connecting rod pivotally connected to said amplifying lever; a minor eccentric driven by the gear; and linkage means operatively engaged with said minor eccentric and bearing on the rear of the cutter means to thrust the cutting tool edgewise into the work on its cutting stroke only, the relationship between the major eccentric with its associated amplifying lever and the minor eccentric with its associated linkage means being such that the edgewise thrust is only a small fraction of the endwise movement.

10. A power driven, reciprocable, manually portable cutting tool, comprising: a frame; a motor in said frame; said motor having a shaft provided with a pinion; a gear journaled in the frame and meshing with said pinion; a major eccentric on the gear which has a major connecting rod; an amplifying lever pivoted in the frame and making driving connection with said connecting rod; a tool plunger pivotally connected to the free end of said lever, said tool plunger having a toothed cutting tool secured to its outer end; a bell crank pivoted in the frame which has a supporting roller on one arm bearing against the back of the cutting tool; a minor eccentric on the gear; means for transmitting motion from the minor eccentric to the bell crank to thrust the tool edgewise into the work during its cutting stroke; and resilient means bearing on the tool plunger to retract the tool from the work on its return stroke.

11. A power driven, reciprocable, manually portable cutting tool comprising: a frame; a motor in said frame; said motor having a shaft provided with a pinion; a gear journaled in the frame and meshing with said pinion; cutter means mounted in said frame for movement generally endwise of itself, said cutter means including a tool plunger and a cutting tool secured thereto; a major eccentric on the gear; a lever pivoted on the frame and operatively connected to the major eccentric and to the tool plunger for imparting endwise movement to the tool plunger; a minor eccentric on the gear; and means for transmitting thrust from the minor eccentric to the rear edge of the cutting tool behind the teeth thereof, the positions and relative strokes of said eccentric means with respect to each other being such that the cutting edge of the tool thrusts edgewise into the work in an elongated oval path during its cutting stroke.

12. A power driven, reciprocable, manually portable cutting tool comprising: a frame; a motor in said frame, cutter means mounted in the frame for movement generally endwise of itself, said cutter means including a tool plunger and a toothed cutting tool secured thereto; a gear having driving connection with the motor; major eccentric means driven by said gear and operatively pivotally connected to the tool plunger for imparting endwise movement thereto; minor eccentric means driven by the gear and operating a member for thrusting the cutting tool edgewise into the work during its cutting stroke only; and spring means resiliently urging the cutter means into engagement with said member.

13. In a machine of the type described: a frame; a foot plate on the frame adapted to support the machine for manual sliding on the work; a motor in the frame; a gear journaled in the frame and having driving connection with the motor; a lever pivotally mounted at one end in the frame; cutter means pivotally connected to the other end of said lever, said cutter means including a tool plunger and a generally vertical saw blade attached thereto and protruding below said base; major eccentric means on the gear operatively connected to said lever intermediate the ends thereof for imparting generally endwise movement to the cutter means; thrust means mounted for oscillating movement in the frame and bearing against the rear edge of the saw blade immediately above the foot plate; resilient means urging said cutter means toward said thrust means; and minor eccentric means on the gear for imparting oscillating movement to said thrust means, the whole cooperating to move the saw blade in an elongated oval path.

14. A power driven portable cutting tool comprising: a frame; a foot plate on the frame adapted to support the tool on the work; a motor in the frame; a gear journaled in the frame and operatively driven by the motor; a major eccentric on the gear; a connecting rod journaled on said eccentric; a lever pivoted in the frame and having pivotal connection with said connecting rod; a tool plunger pivotally connected to the free end of said lever; a cutting tool secured to the outer end of said tool plunger; thrust means bearing against the rear edge of the cutting tool between the tool plunger and base plate; spring means for pressing the cutting tool against said thrust means; a minor eccentric on the gear; and a connecting rod operatively connecting said minor eccentric to said thrust means, the whole cooperating to thrust the cutting tool in an elongated elliptical sweep during its cutting stroke and to retract it during its return stroke.

References Cited in the file of this patent

UNITED STATES PATENTS

| | | |
|---|---|---|
| 1,165,298 | Vaughan | Dec. 21, 1915 |
| 1,269,883 | Wardman | June 18, 1918 |
| 1,826,187 | Pickering | Oct. 6, 1931 |
| 1,834,635 | Overall | Dec. 1, 1931 |
| 2,619,133 | Vulliet-Durand | Nov. 25, 1952 |
| 2,695,522 | Papworth | Nov. 30, 1954 |
| 2,705,980 | Papworth | Apr. 12, 1955 |